(12) United States Patent
Bigolin et al.

(10) Patent No.: US 10,647,372 B2
(45) Date of Patent: May 12, 2020

(54) SUPPORT ELEMENT FOR THE HUMAN BODY, SUCH AS A SADDLE

(71) Applicant: Selle Royal S.p.A., Pozzoleone (Vicenza) (IT)

(72) Inventors: Barbara Bigolin, Pozzoleone (IT); Sebastian Hess, Pozzoleone (IT); Thomas Overthun, Pozzoleone (IT)

(73) Assignee: SELLE ROYAL S.P.A., Pozzoleone (Vicenza) (IT)

( * ) Notice: Subject to any disclaimer, the term of this patent is extended or adjusted under 35 U.S.C. 154(b) by 0 days.

(21) Appl. No.: 16/082,134

(22) PCT Filed: Apr. 11, 2017

(86) PCT No.: PCT/IB2017/052085
§ 371 (c)(1),
(2) Date: Sep. 4, 2018

(87) PCT Pub. No.: WO2017/178969
PCT Pub. Date: Oct. 19, 2017

(65) Prior Publication Data
US 2019/0118886 A1    Apr. 25, 2019

(30) Foreign Application Priority Data
Apr. 15, 2016 (IT) .......................... 102016000039173

(51) Int. Cl.
| B62J 1/00 | (2006.01) |
| B62J 1/02 | (2006.01) |
| B62J 1/08 | (2006.01) |
| B62J 1/10 | (2006.01) |
| B62J 1/26 | (2006.01) |

(52) U.S. Cl.
CPC ................. *B62J 1/007* (2013.01); *B62J 1/00* (2013.01); *B62J 1/08* (2013.01); *B62J 1/26* (2013.01)

(58) Field of Classification Search
CPC ................. B62J 1/007; B62J 1/08; B62J 1/26
USPC .............................. 297/195.1–215.15, 452.56
See application file for complete search history.

(56) References Cited

U.S. PATENT DOCUMENTS

| 5,165,752 | A | * | 11/1992 | Terry | B62J 1/18 297/214 X |
| 5,597,202 | A | | 1/1997 | Andersen | |
| 5,927,802 | A | | 7/1999 | Kesinger | |
| 6,666,507 | B1 | | 12/2003 | Ringgard | |
| 6,739,656 | B2 | * | 5/2004 | Yu | B62J 1/00 297/197 |
| 6,957,857 | B1 | * | 10/2005 | Lee | B62J 1/00 297/195.1 |
| 7,059,674 | B2 | * | 6/2006 | Garland | B62J 1/00 297/195.1 |

(Continued)

FOREIGN PATENT DOCUMENTS

WO         98/15424        4/1998

OTHER PUBLICATIONS

International Search Report for PCT/IB2017/052085 dated Jun. 27, 2017 (2 pages).

*Primary Examiner* — Rodney B White
(74) *Attorney, Agent, or Firm* — Tutunjian & Bitetto, P.C.

(57) ABSTRACT

Support element for the human body or saddle for a vehicle, a bicycle or a motorcycle including a support structure, in which the support element includes at least one fabric component constrained at respective ends or edges to the support structure.

18 Claims, 5 Drawing Sheets

(56) References Cited

U.S. PATENT DOCUMENTS

| | | | | |
|---|---|---|---|---|
| 7,124,844 B2 * | 10/2006 | Bourgeois | ............... | B62J 1/12 |
| | | | | 297/204 X |
| 9,085,333 B1 * | 7/2015 | Watts | ............... | B62J 1/08 |
| 9,102,377 B2 * | 8/2015 | Reeb | ............... | B62J 1/00 |
| 9,205,888 B1 * | 12/2015 | Watts | ............... | B62J 1/00 |
| 9,751,580 B2 * | 9/2017 | Bigolin | ............... | B62J 1/002 |
| 10,035,553 B2 * | 7/2018 | Bailie | ............... | B62J 1/18 |
| 2008/0265635 A1 * | 10/2008 | Scheffer | ............... | B62J 1/007 |
| | | | | 297/201 |
| 2011/0115265 A1 * | 5/2011 | Scheffer | ............... | B62J 1/005 |
| | | | | 297/204 |

\* cited by examiner

SUPPORT ELEMENT FOR THE HUMAN BODY, SUCH AS A SADDLE

TECHNICAL FIELD OF THE INVENTION

The present invention regards a support element for the human body, for example a saddle for a vehicle, such as a bicycle or a motorcycle, as well as a method for mounting one such support element or saddle.

STATE OF THE PRIOR ART

Many saddles have been proposed for vehicles, which usually comprise a lower casing constrained to a fork, an upper casing constrained to the lower casing and a padding formed on top of the upper casing.

Such saddles therefore have a complex structure that provides for multiple rigid components, as well as connection elements therebetween.

In addition, the saddles proposed up to now, due to the provided elements, are rather heavy and have poor aerodynamic properties.

One saddle according to the state of the art is, for example, the so-called NET™ saddle of Selle Italia provided with an upper layer supported on the lower part by a reticular structure.

Another saddle according to the state of the art is the saddle Saddleco™ by Bombang Inc.

Brooks England has also proposed a saddle provided with an upper layer made of leather and tensioning means for the leather layer, such tensioning means being actuatable by means of a suitable tool.

SUMMARY OF THE INVENTION

One object of the present invention is to provide a new support element, e.g. a saddle for vehicles, in particular for bicycles or motorcycles.

Another object of the present invention is to provide a support element which is comfortable and strong/resistant.

Another object of the present invention is to provide a support element which is light.

Another object of the present invention is to provide a saddle for vehicles, in particular for bicycles or motorcycles which is light, resistant and aerodynamic.

Another object of the present invention is to provide a saddle which is capable of providing greater comfort with respect to the front saddles.

Another object of the present invention is to provide a new saddle that can be personalized in accordance with a user's needs.

Another object of the present invention is to provide a new method for mounting a support element or saddle.

Another object of the present invention is to provide a new method for mounting a support element or saddle which is simple and quick to achieve.

In accordance with one aspect of the invention, a support element or saddle is provided according to the present application.

The present application refers to preferred and advantageous embodiments of the invention.

BRIEF DESCRIPTION OF THE DRAWINGS

Other characteristics and advantages of the invention will be more evident from the description of embodiments of a support element or saddle, illustrated by way of example in the enclosed drawings, in which.

In the drawing set, equivalent parts or components are marked with the same reference numbers.

DETAILED DESCRIPTION OF THE INVENTION

Figure 1:
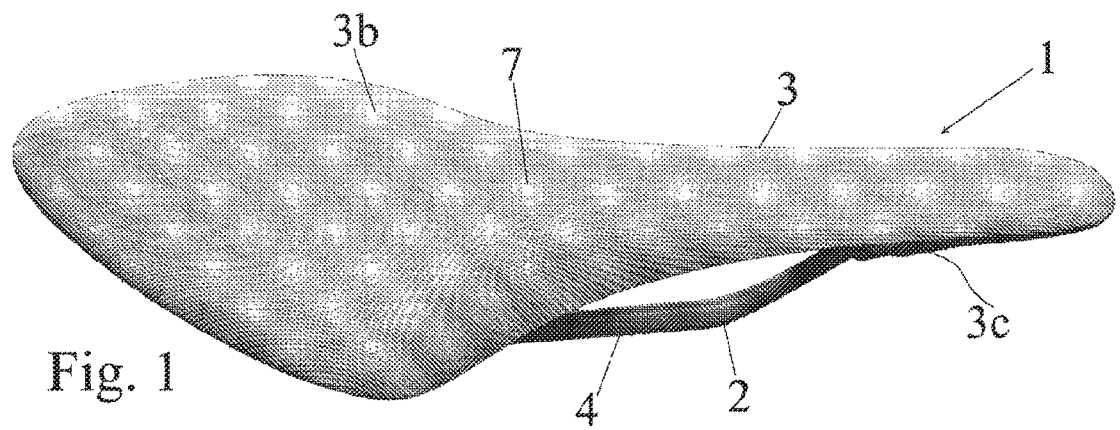
FIGS. 1 and 2 are slightly top and bottom perspective views of a support element according to the present invention.
Figure 2:
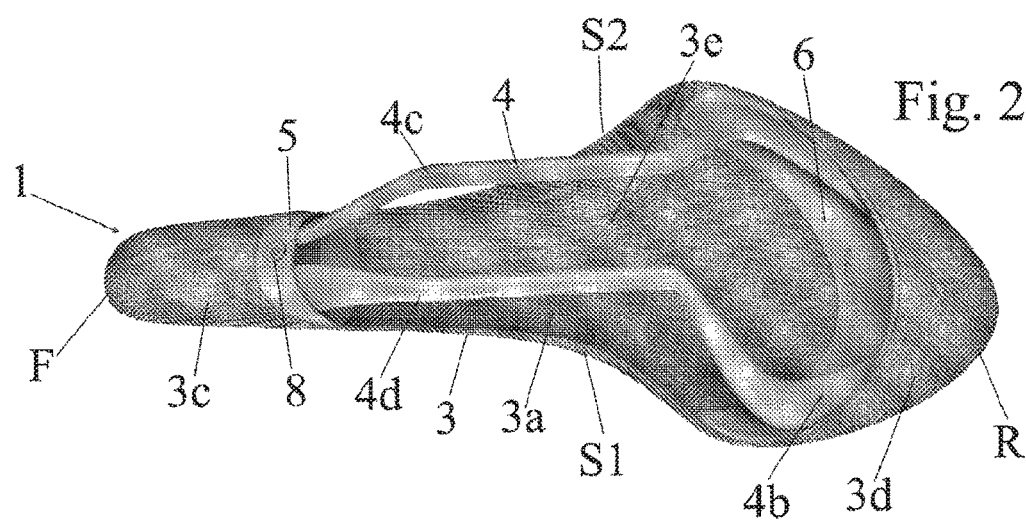
Figure 3:
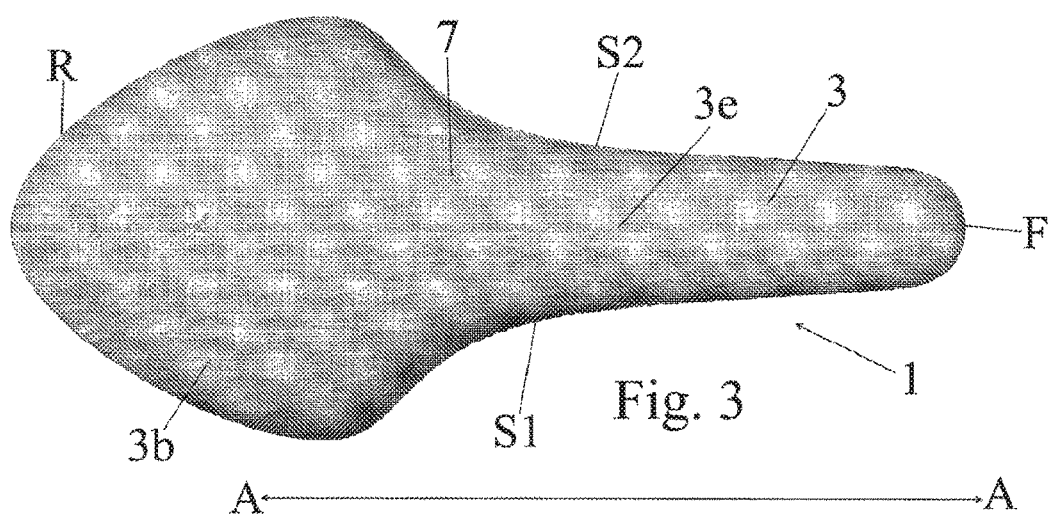
FIG. 3 is a top view of a support element according to the present invention.
Figure 4:
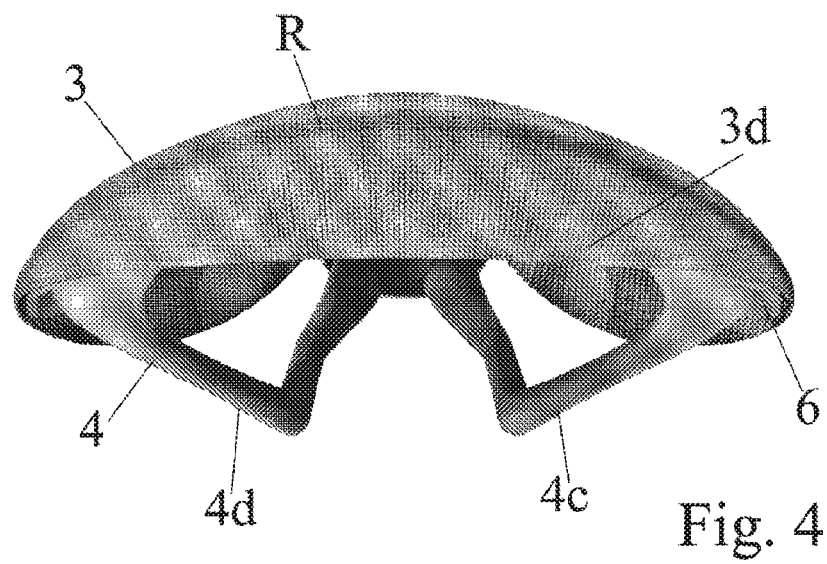
FIG. 4 is a back view of a support element according to the present invention.
Figure 5:
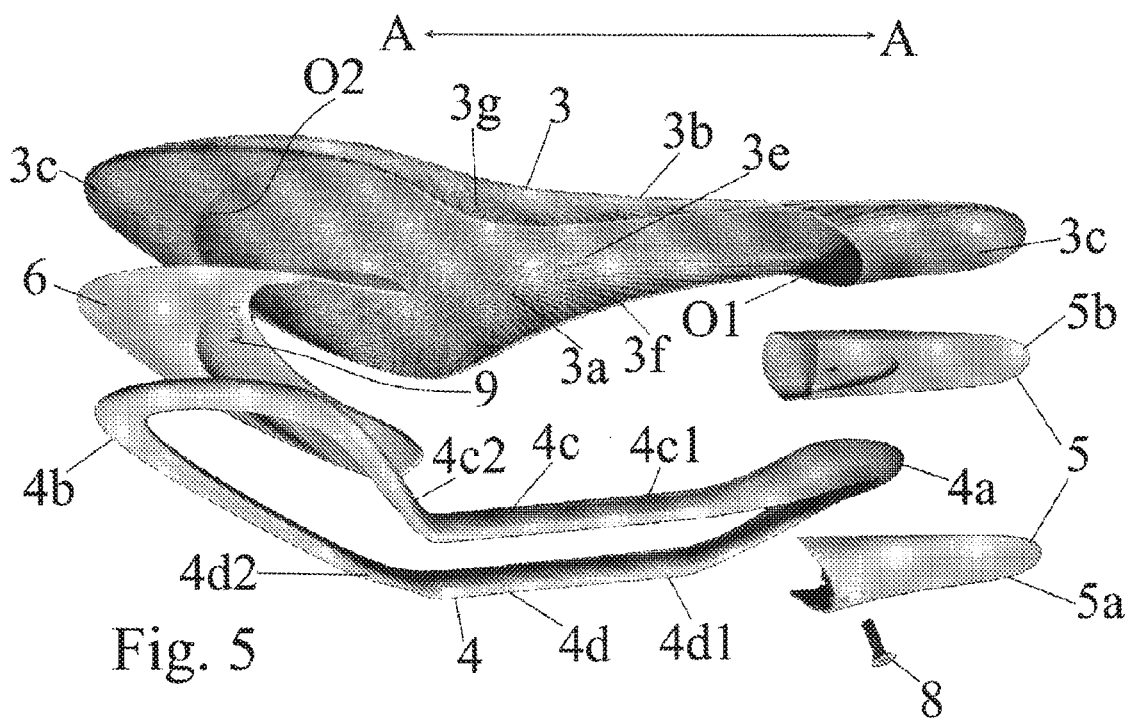
FIG. 5 is an exploded view of a support element according to the present invention.

With reference to FIGS. 1 to 7, a support element for the human body is illustrated, such as a saddle 1 for a vehicle, a bicycle or a motorcycle comprising a support structure 2 as well as at least one fabric component 3 constrained at respective ends or edges to the support structure 2.

The fabric component 3 includes at least one first filament or a first series of filaments 3a. Preferably, the first filament 3a comprises a plurality of main sections substantially parallel to each other and extended in substantially longitudinal or front-back direction, and such main sections are connected two-by-two at the tip or back of the saddle. Still more preferably, the sections of the first filament are extended with continuity one next to the other, e.g. at 1-2 mm from each other, for the entire longitudinal extension of the fabric component and for at least part of the transverse extension of the fabric component.

Advantageously, the fabric component comprises only one first filament 3a.

In addition, the first filament 3a covers the zones of the saddle which, during use, must ensure greater support, in particular an intermediate longitudinal zone that is extended from front to back.

More particularly, the fabric component 3 is supported by the support structure 2 only at respective ends 3c, 3d or edges, while the intermediate or central portion 3e of the fabric component 3 is substantially free, i.e. not resting on other components of the support element or saddle 1.

In addition, the fabric component 3 is preferably placed under tension or slight tension on the support structure, i.e., the fabric component 3 does not result in sagging or in any case not taut during use. More particularly, the fabric component 3 is taut in a manner such that the first layer 3a is subjected to a tension or elongation such to support the weight of the user or athlete.

The first filament 3a preferably has a linear elongation rate, i.e., parallel to the main extension direction of the main sections, lower than 3% and preferably lower than or equal to 2%. If a progressively increasing elongation stress is imparted to such filament, the same undergoes no further elongations after having sustained an elongation equal to 2-3% with respect to its rest length; if however the filament is subjected to a stress in the elongation sense that is greater than a threshold value, the same filament is broken, or rather the threads or filaments thereof are broken.

The first filament 3a is also capable of supporting a very high load, e.g., equal to 120 kg, sufficient for supporting a person without being deformed in a substantial manner, i.e., the first filament or the first filaments 3a allows/allow obtaining a controlled deformation following which the characteristics of the saddle are not changed.

The first filament or the first series of filaments 3a can be made of high-density polyethylene, polyethylene, polyethylene admixed with filaments of a second material, such as polyamide or polyester.

If desired, the fabric component 3 also comprises at least one second filament or a second series of filaments 3b knitted together with or on the first filament 3a. More particularly, the second filament 3b comprises knitted filaments which are melted together, as well as with the first filament or first series of filaments 3a at the time of knitting or melting-yarn. With reference to the second filament or the second series of filaments 3b, since the first filament 3a can be abrasive and such to ruin the clothes of the user of the support element 1, the second filament 3b carries out the function of defining a comfortable seating zone, such as to not abrade the material of the user's clothes in contact with the support element 1.

Due to the melting of the filaments or melting yarn, it is possible to confer a desired form to the saddle and in particular to the sides thereof. For such purpose, the zone on the sides is rounded, and due to this it is possible to avoid making pockets or the like with inserts or supports. In addition, due to the melting yarn, the form or shape of the saddle remains substantially fixed or in any case elastically yieldable also at the sides, so that even if the sides of the saddle or better yet of the fabric component 3 are subjected to stresses, these always return into the original position.

In substance, the first filament 3a constitutes a weft element, while the second filament or the second series of filaments 3b constitutes a warp element.

In addition, the fabric component 3 and in particular the second filament 3b thereof does not have stitching, in particular at the tip and at the sides, such to ensure high comfort for the user. If desired, stitchings could be provided with aesthetic, not structural function.

If desired, the fabric component 3 can also comprise a layer of protection of the respective edges or sides (not illustrated in the figures), which reduces the friction with the legs or thighs of a user and improves the appearance of the support element.

The fabric component 3 on the upper part delimits the seat surface 7 for a user.

In substance, the fabric component is constituted by a tensile structure, actually thermo-welded, which is given by weaves of different weft and warp filaments, so as to obtain a three-dimensional structure.

With reference to the non-limiting embodiment illustrated in the figures, a saddle according to the present invention comprises a front F, a back R and two sides S1, S2, while the support structure 2 includes a fork 4, a first block component or hollow component 5 mounted on the tip 4a of the fork 4 as well as a second block component or hollow component 6 mounted on or connected to the back 4b of the fork 4, and in such case the fabric component 3 delimits a first frontal portion 3c, if desired pocket-like, constrained to or fitted on the first component 5 as well as a second rear portion 3d, if desired pocket-like, constrained to or fitted on the second component 6.

In addition, as stated above, the main longitudinal sections of the first filament 3a are advantageously arranged parallel to the longitudinal extension or to the direction A-A from back R to front F of the saddle.

Preferably, the fabric component 3 is supported by the support structure 2 only at respective ends 3c, 3d or edges, by the tip 4a and by the back 4b of the fork 4, while the intermediate or central portion 3e of the fabric component 3 is substantially free, i.e. it does not rest on other components of the saddle 1.

With regard to the pocket portions 3c, 3d, these respectively delimit an opening for the insertion and housing, if desired substantially to size, of the block or hollow components 5, 6, so that the first pocket portion 3c delimits a first opening O1 directed towards the back R and closed towards the front F, while the second pocket portion 3d delimits a second opening O2 directed towards the front F and closed towards the back R. Clearly, the openings O1 and O2 are below the seat surface 7.

The fabric component 3 can then have lateral flaps 3f, 3g projecting downwards, constituting the sides S1, S2 of the saddle.

At the edge or at the sides, the fabric component can also have ribs or superstructures or folded flaps.

In addition, inserts or supports can also be provided, such as bands of carbon co-extruded with plastic, carbon sheets or sheets made of another material intended to cover the entire length of the saddle or in particular the sides of the saddle. Such supports could be glued or inserted under the first filament or between the first and the second filament.

In addition, the fabric component is constrained to the support structure by means of glue, e.g. thermosetting materials or those intended to ensure a hot melting.

Alternatively, the fabric component could also comprise lateral pockets in which elements are insertable provided for conferring a correct configuration to the saddle, in particular at the respective edges, or saddle protective elements or elements intended for preventing the saddle from undergoing high bending.

The fork 4 of such saddle 1 can be annular and comprise two lateral prongs 4c, 4d that are bridge-connected, at a front end thereof, by means of a front curved portion or C-shaped portion 4a defining the tip of the fork 4 and, at a rear end thereof, by means of rear curved portion or C-shaped portion 4b defining the back of the fork 4. The fork 4 can be made of carbon, if desired carbon fiber or resin, or made of metal such as steel, aluminum or titanium, or made of plastic or of another material.

Each prong 4c, 4c can then include two sections that are tilted with respect to each other, and, more particularly, from the tip 4a to the back 4b, a first substantially rectilinear section 4c1, 4d 1 that, in use, is horizontal or slighted tilted with respect to the horizontal, with the rear end (i.e., distal from the tip 4a and proximal to the back 4b) at a height below the front end thereof, and then a second section 4c2, 4d2 tilted relative to the respective first section 4c 1, 4d 1 by an angle between 60° and 120°, preferably 80°-100°, with the front end (i.e. proximal to the tip 4a and distal from the back 4b) at a height much lower than the rear end thereof; the second section 4c2, 4d2 is then much more tilted with respect to a direction that is horizontal during use.

In addition, the fork 4 can have, from the tip to the rear end of the prongs, a width that is progressively increasing in a substantially gradual manner. The rear curved portion 4b instead has, starting from the rear ends of the prongs 4*c*, 4*d*, a width first increasing until it reaches a maximum width equal to about ⅕-2 times the distance between the rear ends of the prongs 4*c*, 4*d*, and then decreasing.

With reference to the block or hollow components 5, 6, the first component 5 can comprise a tapered body within which the tip 4*a* of the fork 4 is arranged and fixed, while around the same, the first pocket portion 3*c* of the fabric component 3 is fitted and mounted. In addition, the first hollow component 5 can comprise a pair of half-shells 5*a*, 5*b* mounted opposite each other with respect to the tip 4*a* of the fork 4 and connected by means of a connection means, such as a screw or a bolt 8, such connection means during use being housed in the zone delimited by the front curved portion 4*a*; if desired the screw or the bolt 8, during use, is abutted, from the interior (i.e. starting from the zone delimited by the portion 4*a*), against a wall section of the front curved portion 4*a*, so as to be opposed to the unthreading of the fork 4 from the first hollow component 5.

The second hollow component 6 can instead comprise a box-like element that is substantially curved and defining a seat 9 for housing the back 4*b* of the fork 4 or of the rear curved portion 4*b*, and such seat 9 is open towards the front F. Around the box-like element 6, the second pocket portion 3*d* of the fabric component 3 is also fitted and mounted.

Clearly, the fork could also not be annular, and could have a substantially U-shaped configuration, with the rear ends of the prongs constrained to and if desired glued or connected to size in an anchorage or suspension component.

Figure 6:
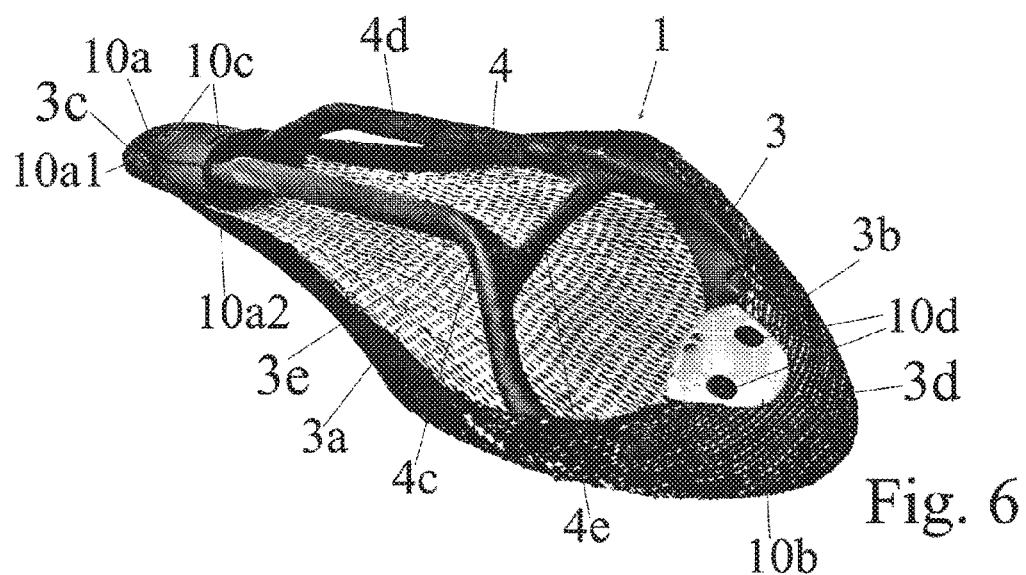
FIG. 6 is a slightly bottom perspective view of another embodiment of a support element according to the present invention.
Figure 7:
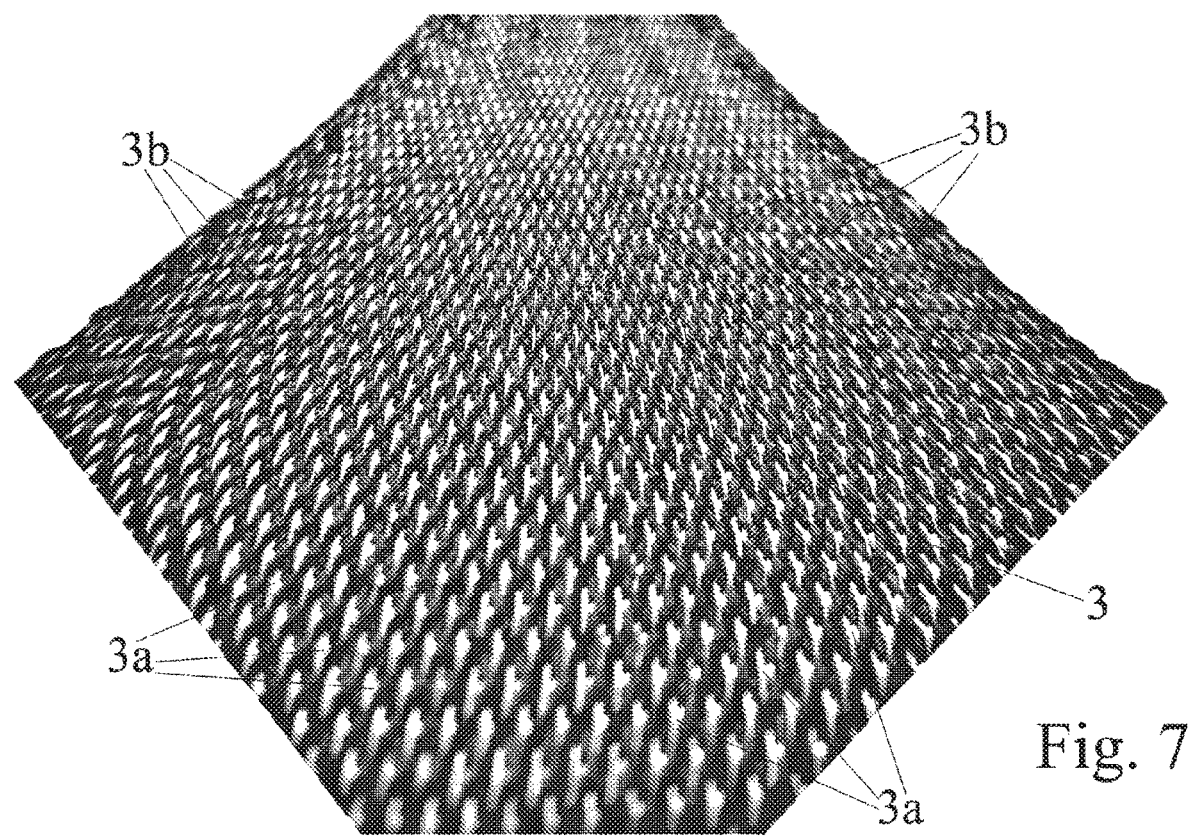
FIG. 7 is an enlarged view of a detail of a fabric component of a support element according to the present invention.

The fork could also have a stiffening element 4*e*, see FIG. 6, which can be extended from one prong 4*c* to the other 4*d*, if desired at the respective rear ends.

The support element or saddle (see FIG. 6 once again) could then have one or more constraining or tensioning components 10*a*, 10*b* of the fabric component 3. For such purpose, the constraining or tensioning component or components 10*a*, 10*b* could delimit an insertion slit for a respective edge section of the fabric component 3 and then have clamping means, such as one or more clamping screws 10*c*, 10*d* set to tighten the edge of the fabric component 3 within the slit of the component or of a respective constraining component 10*a*, 10*b*. The constraining component 10*a*, 10*b* could be provided at the front F and/or at the back R of the support element and, more particularly, in a zone below the seat surface 7.

A constraining component 10*a* arranged on the front F could for example be usable in replacement of a block or hollow component 5 and comprise a pair of half-shells 10*a*1, 10*a*2 mounted opposite each other with respect to the tip 4*a* of the fork 4 and connected by means of a clamping means, such as one or more screws or bolts 10*c*, with a front portion of the fabric component arranged and tighten between the two half-shells 10*a*1, 10*a*2.

If desired, a constraining component 10*b*—e.g., usable in replacement of a block or hollow component 6—placed on the back could instead constitute the anchorage or suspension component constrained to the rear ends of the prongs 4*c*, 4*d* of the fork 4.

The constraining component 10*b* placed on the back R could also comprise a pair of half-shells mounted opposite each other with respect to the back of the fork 4 or to the rear ends of the prongs of the fork 4 and connected by means of a clamping means, such as one or more screws or bolts, with a rear portion of the fabric component arranged and tighten between the two half-shells of the constraining component 10*b*.

Figure 8:
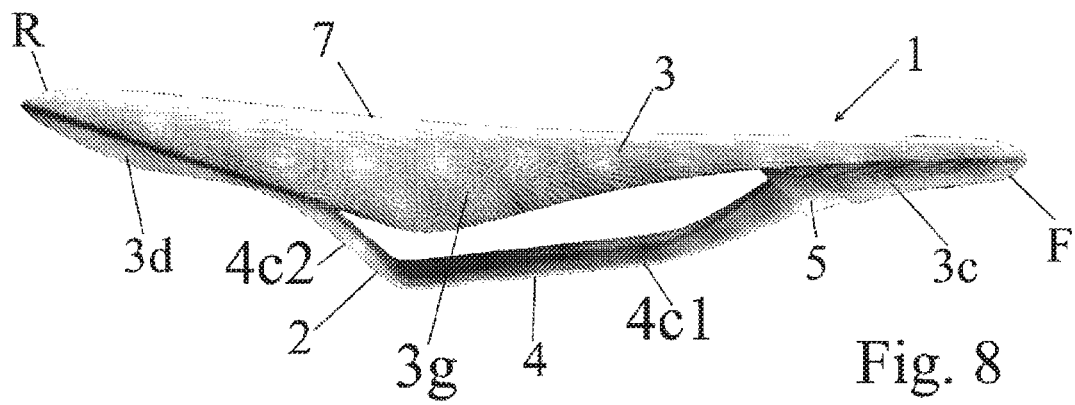
FIGS. 8 to 10 are side views of support elements according to the present invention.
Figure 9:
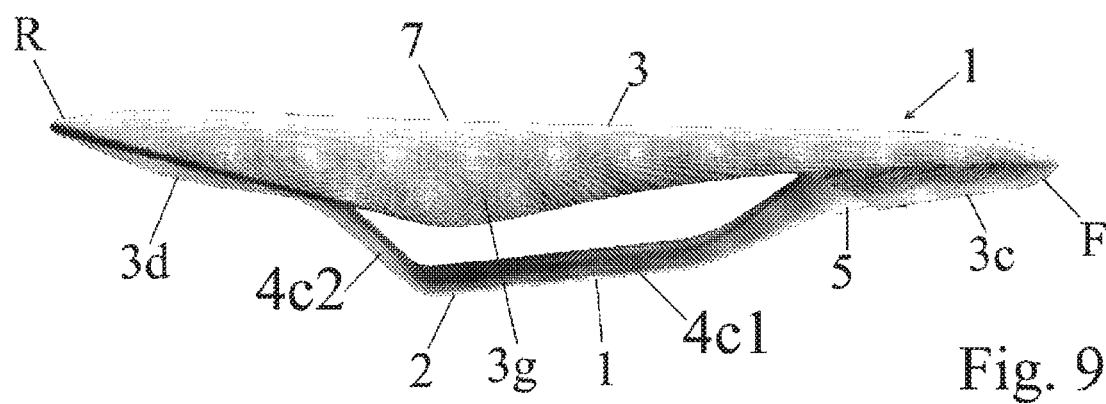
Figure 10:
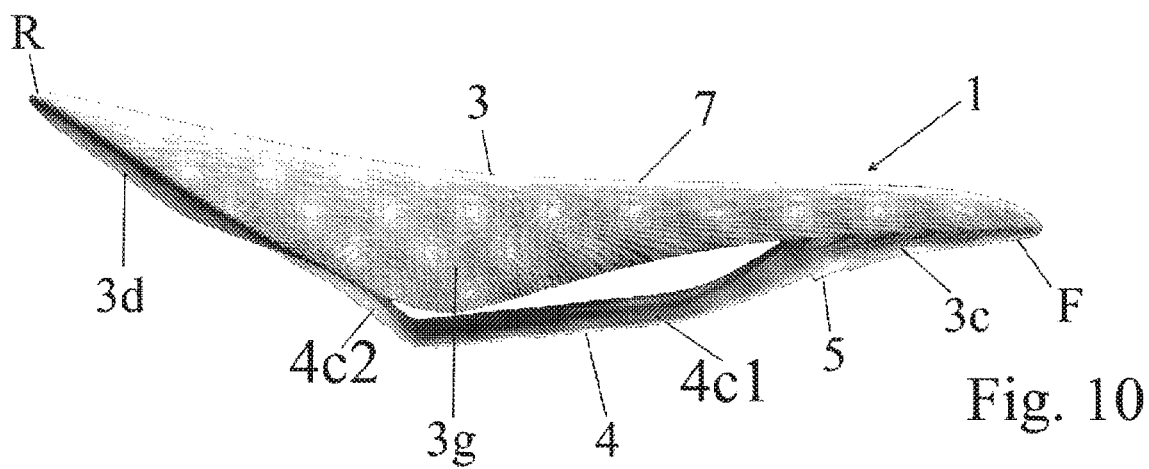
Figure 11:
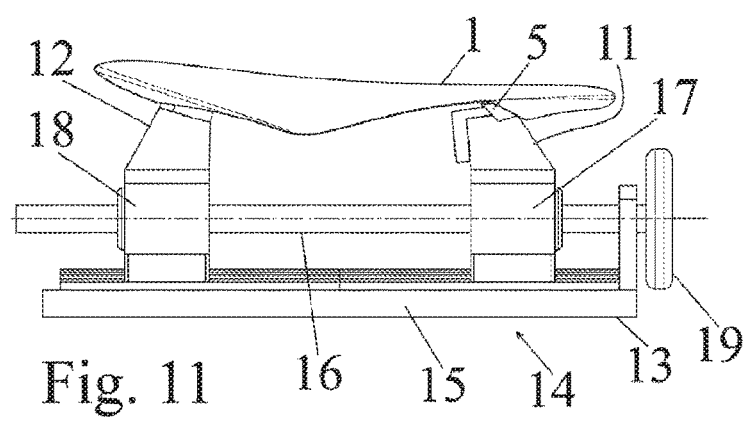
FIGS. 11 to 15 are respectively side, front, top and slightly top perspective views, and from respective sides, of a machine for testing or for mounting a support element according to the present invention.
Figure 12:
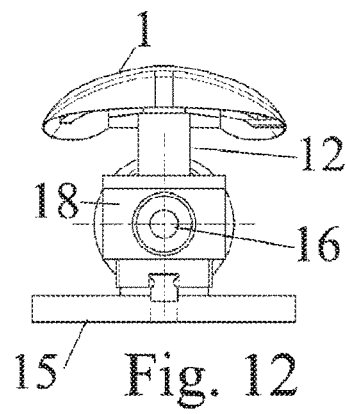
Figure 13:
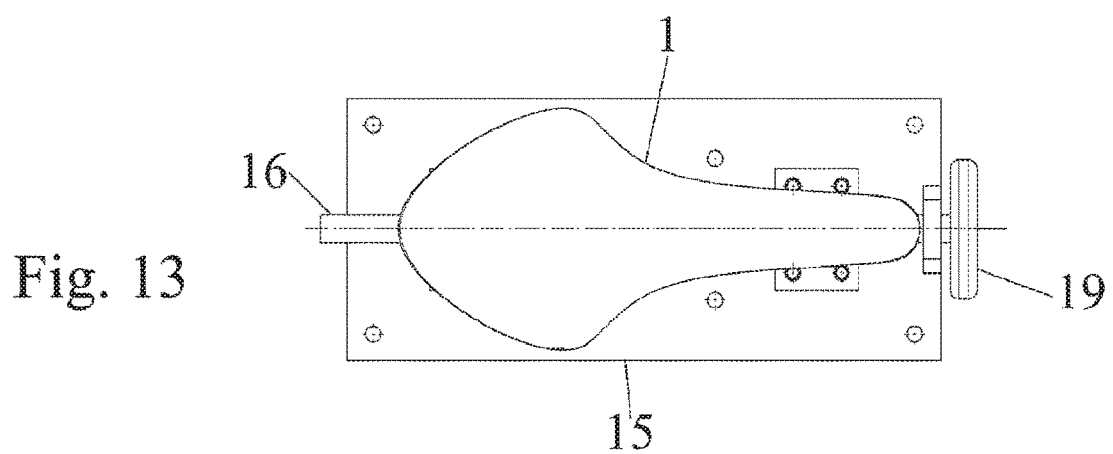
Figure 14:
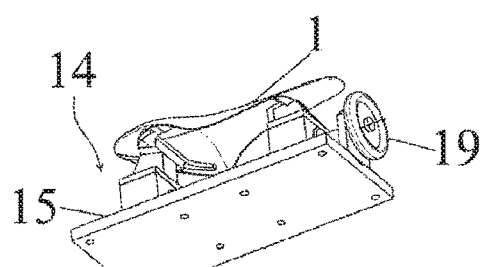
Figure 15:
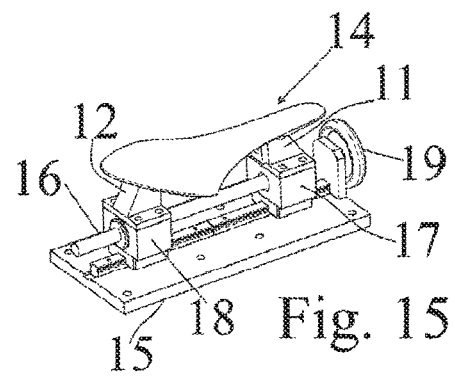

With reference to FIGS. 8 to 10, several embodiments of a saddle 1 in accordance with the present invention are illustrated, which differ from each other due to the tilt of the sections 4*c*1, 4*d*1 relative to the respective sections 4*c*2, 4*d*2 of the prongs 4*c*, 4*d* of the fork 4, as well as due to the extension of the lateral flaps 3*f*, 3*g* of the fabric component.

A method for mounting a support element or saddle 1 according to the present invention comprises the following steps:
  making a fabric component 3;
  arranging at least two support elements 11, 12 approachable-movable away on a main frame 13;
  arranging at least two portions 5, 6, 10*a*, 10*b* of the support structure 2, each on a respective support element 11, 12;
  constraining or fitting ends or edges 3*c*, 3*d* of the fabric component 3 to or on the portions 5, 6, 10*a*, 10*b* of the support structure,
  moving the support elements 11, 12, so as to move away the two portions 5, 6, 10*a*, 10*b* of the support structure and thereby stretching the fabric component 3;
  releasing the fabric component 3 with the portions 5, 6, 10*a*, 10*b* of the support structure 2 from the main frame 13, for example by first releasing the support elements 11, 12 or part thereof from the main frame 13 and then releasing the fabric component 3 with the portions 5, 6, 10*a*, 10*b* from the support elements 11, 12 or from part thereof.

In particular, if the support element is a saddle 1, then the block or hollow components 5, 6 or the constraining components 10*a*, 10*b* of the support structure 2 are arranged and constrained, e.g. by means of screws or bolts, each on a respective support element 11, 12 and, when they are in an approached position, a tip end 3*c* of the fabric component 3 is fitted or constrained on/to a component 5, 10*a* thereof, and a rear end 3*d* of the fabric component 3 is fitted or constrained on/to a component 6, 10*b*. Subsequently, by moving away the support elements 11, 12, one stretches the fabric component 3 and in particular the intermediate or central portion 3*e* in a manner such that the first layer 3*a* is subjected to an elongation between 0.5% and 3%.

In addition, before or after having released the fabric component 3 with the portions 5, 6, 10*a*, 10*b* of the support structure 2 from the support elements 11, 12, a spacer component or a fork 4 is connected or constrained to the two portions 5, 6, 10*a*, 10*b* of the support structure 2.

In order to achieve a method according to the present invention, a fabric component 3 is attained by knitting a first filament 3*a* or only one first filament 3*a* with substantially parallel main sections placed alongside each other, preferably by knitting the sections with continuity one next to the other, e.g., at 1-2 mm from each other. Preferably, for obtaining a fabric component 3, provision is also made for a step for making a second filament 3*b* which is knitted together with the first filament 3*a* or knitted thereon. The second filament can also be obtained via knitting together with the first filament, with melting of the filaments at the time of knitting.

A method according to the present invention can be conducted with the aid of a machine 14 (see FIGS. 11 to 15) which comprises a frame 13 including a base 15 having a shaft 16 and two uprights 17, 18, one or both of which slidably mounted on the base 15; such uprights 17, 18 carry the support elements 11, 12 at the top, which can be removably connected, if desired by means of bolts, at the head of the uprights 17, 18. The shaft 16 is mounted through holes of the two uprights 17, 18 and, more particularly, it can be externally threaded and intended to be used for meshing with an internally threaded portion of the uprights 17, 18 defining the respective holes for the passage of the shaft 16. Means for rotating the shaft 16 are then provided for, e.g. a small wheel 19 mounted or fitted on the shaft 16. By actuating the rotation means 19, a sliding is determined for approaching or moving away the uprights 17, 18 and hence the support elements 11, 12.

The machine 14 can also be used for carrying out tests on the fabric component 3.

As will be understood, a support element according to the present invention is very light, aerodynamic and has a very simple structure, considering that the seat portion is only constituted by the fabric component, hence without casings or the like below the same. Nevertheless, the fabric component, in particular due to the configuration of the first filament, is very resistant and, in particular due to the second filament or the second series of filaments, comfortable for the user.

In addition, the support element also has a very pleasant appearance which can vary as a function of the user's tastes. With regard to such aspect, it is in fact possible to easily integrate logos, designs or writing in the fabric component, without requiring stitchings.

Modifications and variations of the invention are possible within the protective scope defined by the claims.

The invention claimed is:

1. A support element for the human body or saddle for a vehicle, a bicycle or a motorcycle comprising a support structure, wherein said support element comprises at least one fabric component constrained at respective ends or edges to said support structure,
   wherein said at least one fabric component includes at least one first filament or a first series of substantially parallel knitted filaments, placed one next to the other;
   wherein said first filament comprises a plurality of substantially main sections parallel to each other and extending in a substantially longitudinal or front (F) to back (R) direction, which main sections are connected two by two at the tip or back of said support element.

2. The support element according to claim 1, wherein said main sections of said first filament extend with continuity next to each other by the entire longitudinal extension of said fabric component, and by at least part of the transverse extension of said fabric component.

3. The support element or saddle according to claim 1, wherein said at least one first filament or said first set of filaments is made of high density polyethylene, polyethylene, polyethylene admixed with filaments of a second material, comprising polyamide or polyester.

4. The support element or saddle according to claim 1, wherein said at least one first filament has a linear elongation rate parallel to the main extension direction of the respective filaments, lower than 3% and preferably lower than or equal to 2%.

5. The support element or saddle according to claim 1, wherein said fabric component extends from one side (S1) to the other (S2) and from the front (F) to the back (R) of said support element or saddle.

6. The support element or saddle according to claim 1, wherein said fabric component is supported by said support structure only at respective ends or edges, while an intermediate or central portion of said fabric component is substantially free so as to not be resting on other components of said support element or saddle.

7. The support element or saddle according to claim 1, wherein said at least one fabric component comprises at least one second filament or a second series of filaments knitted together with or on the first filament.

8. The support element or saddle according to claim 7, wherein said at least one second filament comprises filaments knitted and melted together as well as with the first filament or first set of filaments.

9. The saddle according to claim 7, comprising a front (F), a back (R) and two sides (S1, S2), wherein said support structure comprises a fork, a first block or hollow or constraint component mounted on or connected to a tip of said fork as well as a second block or hollow or constraint component mounted on or connected to a back of said fork, said at least one fabric component delimiting a first front portion fitted on or constrained to said first component and a second rear portion fitted on or constrained to said second component, said at least one fabric component delimiting a seat surface for a user.

10. The saddle according to claim 9, wherein said first front portion and/or said second rear portion comprise/comprises a pocket portion, said pocket portion delimiting an insertion and housing opening substantially of a respective block or hollow component.

11. The saddle according to claim 9, wherein said at least one constraint component comprises a tensioning component of said fabric component.

12. The saddle according to claim 11, wherein said tensioning component defines an insertion slit of a respective edge segment of said fabric component and further includes clamping means arranged to tighten the edge of said fabric component within said slit.

13. The saddle according to claim 1, wherein the filaments of a first layer are parallel to the longitudinal extension or to the direction (A-A) from the back (R) to the front (F) of said saddle.

14. A method for mounting a support element comprising a support structure, wherein said support element comprises at least one fabric component constrained at respective ends or edges to said support structure, the method comprising the steps of:
   making a fabric component;
   arranging at least two support elements which are approachable or movable away from each other along a main frame;
   arranging at least two portions of said support structure each on a respective support element;
   fitting or constraining ends or edges of said fabric component on the portions of said support structure,
   moving said support elements away, so as to move away the two portions of the support structure and thereby stretching said fabric component; and
   releasing said fabric component with the portions of said support structure from said support elements.

15. The method according to claim 14, wherein said block or hollow components or said constraining components are arranged and constrained each on a respective support element and, when they are in the approached position, a tip end of the fabric component is fitted on or constrained to a component thereof, and a back end of the fabric component is fitted on or constrained to the other component, subsequently by moving away said support elements, the fabric component and in particular the intermediate or central portion of the same is stretched.

16. The method according to claim 14, wherein before or after having released said fabric component with the portions of said support structure from said support elements, a spacer component or a fork is connected or constrained to said at least two portions of said support structure.

17. A support element for the human body or saddle for a vehicle, a bicycle or a motorcycle comprising a support structure, wherein said support element comprises at least one fabric component constrained at respective ends or edges to said support structure, wherein said at least one fabric component comprises at least one second filament or a second series of filaments knitted together with or on the first filament, and wherein said at least one second filament comprises filaments knitted and melted together as well as with the first filament or first set of filaments.

18. A support element for the human body or saddle for a vehicle, a bicycle or a motorcycle comprising a support structure, wherein said support element comprises at least one fabric component constrained at respective ends or edges to said support structure, wherein said at least one fabric component comprises at least one second filament or a second series of filaments knitted together with or on the first filament, wherein the support element or saddle further comprises a front (F), a back (R) and two sides (S1, S2), wherein said support structure comprises a fork, a first block or hollow or constraint component mounted on or connected to a tip of said fork as well as a second block or hollow or constraint component mounted on or connected to a back of said fork, said at least one fabric component delimiting a first front portion fitted on or constrained to said first component and a second rear portion fitted on or constrained to said second component, said at least one fabric component delimiting a seat surface for a user, wherein said at least one constraint component comprises a tensioning component of said fabric component, and wherein said tensioning component defines an insertion slit of a respective edge segment of said fabric component and further includes clamping means arranged to tighten the edge of said fabric component within said slit.

\* \* \* \* \*